United States Patent
Lam et al.

(10) Patent No.: US 7,969,117 B2
(45) Date of Patent: Jun. 28, 2011

(54) METHOD AND DEVICE FOR CHARGING PERIPHERALS

(75) Inventors: Hue V. Lam, Portland, OR (US); Robert Alan Jacobs, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 12/614,115

(22) Filed: Nov. 6, 2009

(65) Prior Publication Data

US 2010/0066303 A1 Mar. 18, 2010

Related U.S. Application Data

(63) Continuation of application No. 11/607,070, filed on Dec. 1, 2006, now Pat. No. 7,626,358.

(51) Int. Cl.
*H02J 7/00* (2006.01)
*A61B 5/00* (2006.01)

(52) U.S. Cl. ......... 320/114; 320/107; 320/115; 600/300

(58) Field of Classification Search .................. 320/103, 320/114
See application file for complete search history.

(56) References Cited

U.S. PATENT DOCUMENTS

| | | | | |
|---|---|---|---|---|
| 5,541,489 A * | 7/1996 | Dunstan | | 320/134 |
| 5,920,306 A * | 7/1999 | Kikinis | | 345/158 |
| 6,476,795 B1 * | 11/2002 | Derocher et al. | | 345/163 |
| 6,653,813 B2 | 11/2003 | Khatri | | |
| 6,780,154 B2 * | 8/2004 | Hunt et al. | | 600/446 |
| 6,820,206 B1 | 11/2004 | Kim et al. | | |
| 6,852,084 B1 | 2/2005 | Boesen | | |
| 2005/0017674 A1 * | 1/2005 | Sato | | 320/106 |
| 2005/0151506 A1 * | 7/2005 | Kennedy et al. | | 320/111 |
| 2005/0174091 A1 * | 8/2005 | Dayan et al. | | 320/128 |
| 2005/0213297 A1 | 9/2005 | Ulla et al. | | |

* cited by examiner

*Primary Examiner* — Edward Tso
*Assistant Examiner* — Ahmed Omar
(74) *Attorney, Agent, or Firm* — Pillsbury Winthrop Shaw Pittman LLP

(57) ABSTRACT

The invention includes a peripheral charging system for a computer. The peripheral charging system comprises a retention mechanism configured to retain a peripheral having a battery, the retention mechanism comprising a charging mechanism, and a system battery electrically connected to the charging mechanism. When the peripheral is retained by the retention mechanism, the peripheral contacts the charging mechanism of the retention mechanism to charge the peripheral battery. The invention also comprises a method for charging a peripheral for a mobile computing device. The method comprises retaining the peripheral in a retention mechanism of the mobile computing device, and charging a battery of the peripheral device from a battery of the mobile computing device. The retention mechanism of the mobile computing device includes a charging mechanism configured to supply charge to a charging mechanism of the peripheral.

23 Claims, 3 Drawing Sheets

METHOD AND DEVICE FOR CHARGING PERIPHERALS

FIELD OF INVENTION

The embodiments of the invention relate to a mobile computing device with integrated medical devices such as stethoscopes, blood pressure monitors, vital signs monitors, and other instruments that may be used in a clinical or hospital environment for monitoring the welfare of a patient. Illustrative of computing devices according to the present invention are tablet-style personal computers designed to communicate wirelessly with various medical testing instruments while being convenient to hold and operate and resistant to penetration by fluids.

The embodiments of the invention further relate to the field of charging peripheral devices associated with the mobile computing device. More specifically, this invention relates to a mobile computing device having a mechanism for retaining and associated charging one or more peripheral devices.

BACKGROUND

A class of personal computers that is smaller than the typical "desktop" or "laptop" devices is known in the art as "tablet" personal computers, or tablet PCs. Such computing devices are generally known for use as personal digital assistants and as specialized, mobile computers. Tablet PCs typically offer the advantage of a small form factor that is easy for the user to carry, but at the cost of limited utility with respect to their full-sized counterparts.

As used herein, the term tablet PC refers to a computer, such as a personal computer, incorporating various convenient and intuitive aspects of pencil and paper into a user's interaction with the computer. Tablet PCs commonly include a stylus. A stylus secretes no ink and is used with a touch screen of the PC. A stylus permits data entry directly into the device via a digitizer, which is positioned behind a display screen to permit data entry by a user. The stylus is typically passive. A suitable stylus device includes the Wacom "Penabled Tablet PC Slim Pen", model MP200-00 that is 5.5 mm in diameter. The digitizer can report up to 256 different levels of pressure when the stylus is pressed against the acrylic LCD protector.

Tablet PC also refers to a computer, such as a personal computer or a mobile computing device, incorporating various convenient and intuitive aspects of pencil and paper into a user's interaction with the computer. The term "computer" may include at least one central processing unit or CPU (processor) connected to a host bus. The CPU may be any of various types, including an x86 processor, e.g., a Pentium class, a PowerPC processor, a CPU from the SPARC family of RISC processors, as well as others. The computer system may also include various memory mediums, typically including RAM and referred to as main memory. The main memory may store one or more programs implementing the present invention. The main memory may also store operating system software, as well as other software for operation of the computer system. The term "mobile computing device," as used herein, means any computing device intended to move location while maintaining functionality. Mobile computing devices can include, for example, laptop computers, subnotebooks, personal digital assistants, portable data terminals, tablet PCs, and even smartphones.

PCs, such as tablet PCs, are often used with various peripheral devices such as keyboards, mice, and printers, many of which communicate with the PC wirelessly such as through Bluetooth technology. The wired peripheral devices each have their own cord that delivers power or, if running on battery power, have a charging adapter. In the case of a portable device, a cord that delivers power or charging adapter must be taken along for each peripheral, increasing the system's weight and complexity. If the user forgets a power cord or charging adapter and the peripheral's battery loses power, the user must obtain another cord/adapter or work without that peripheral. Indeed, the user may need the peripheral and not be able to obtain a replacement cord/adapter.

Further, peripherals are provided independently of the PC and therefore may become misplaced or require the user to locate the peripheral in a location separate from the PC before being able to charge it and use it.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

Figure 1:
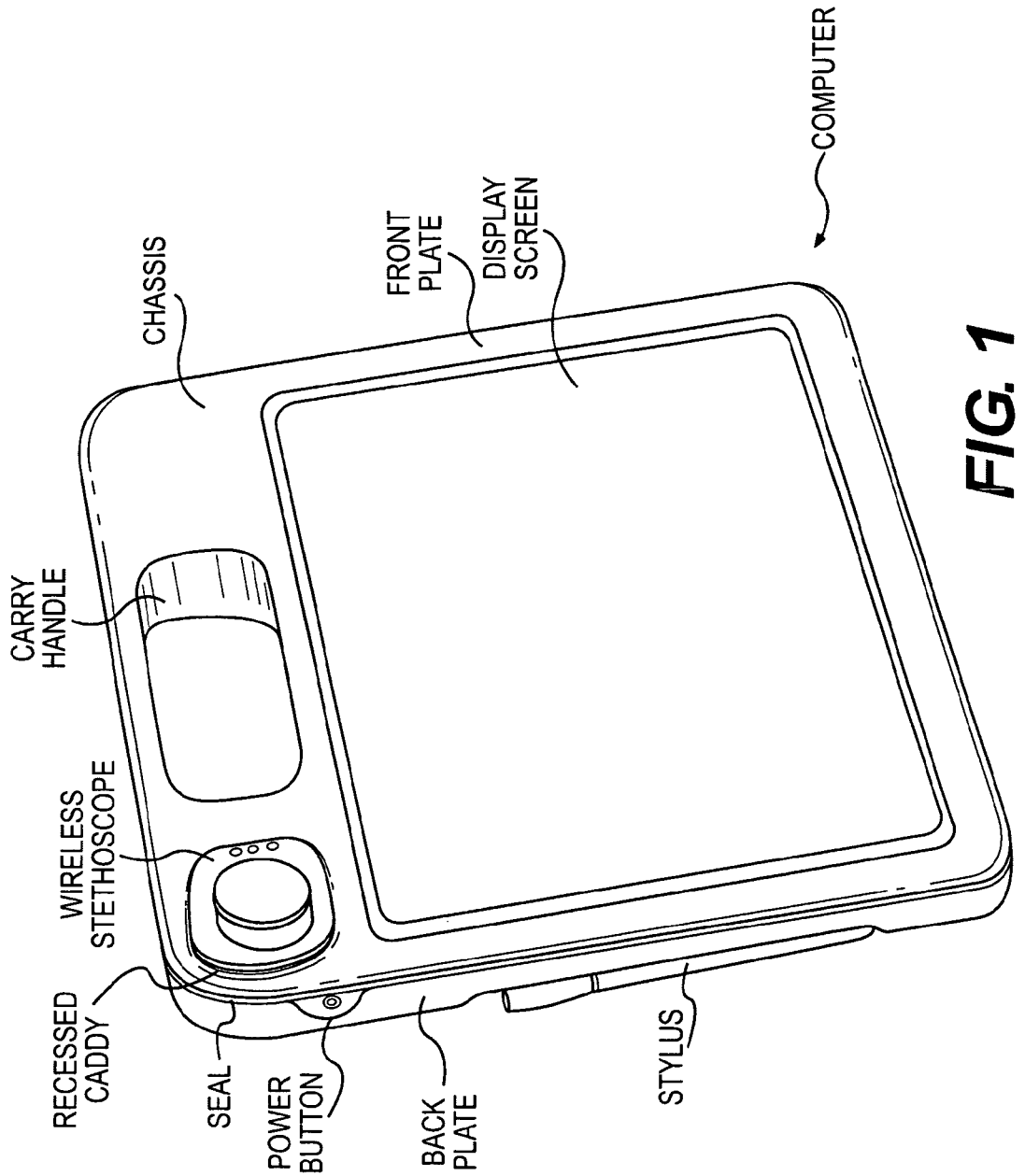
FIG. 1 is a perspective view of a tablet PC having a peripheral charger in accordance with the present invention.

As used in the specification and claims, the singular forms "a," "an," and "the" include plural references unless the context clearly dictates otherwise. For example, the term "an array" may include a plurality of arrays unless the context clearly dictates otherwise.

In one embodiment, the invention is directed to a peripheral charging system for a computer. The peripheral charging system comprises a retention mechanism configured to retain a peripheral having a battery, the retention mechanism comprising a charging mechanism, and a system battery electrically connected to the charging mechanism. When the peripheral is retained by the retention mechanism, the peripheral contacts the charging mechanism of the retention mechanism to charge the peripheral battery.

In another embodiment, the invention is directed to a mobile computing device configured to retain and charge a peripheral having a battery. The mobile computing device comprises a chassis including a retention mechanism configured to retain the peripheral, a charging mechanism located within the retention mechanism, a system battery electrically connected to the charging mechanism, and a microcontroller configured to control charging of the peripheral battery by the system battery when the peripheral is electrically connected to the charging mechanism of the mobile computing device.

The retention mechanism may be a recessed caddy. The peripheral may communicate wirelessly with the computer. The peripheral is a wireless stethoscope. Charging circuitry may limit charge from the system battery. The charging mechanism may comprise one of charging contacts and inductive charges.

In yet another embodiment, the invention is directed to a method for charging a peripheral for a mobile computing device. The method comprises retaining the peripheral in a retention mechanism of the mobile computing device, and charging a battery of the peripheral device from a battery of the mobile computing device. The retention mechanism of the mobile computing device includes a charging mechanism configured to supply charge to a charging mechanism of the peripheral.

The method may further include determining current and voltage needs of the peripheral battery, determining an amount of charge left in the battery of the mobile computing device, and determining whether the battery of the mobile computing device can supply the voltage and current needs of the peripheral battery.

Further features of the present invention, as well as the structure of various embodiments of the present invention are described in detail below with reference to the accompanying drawings.

The current trend for healthcare-specific tablet PCs is to provide medical-related peripheral devices that are integrated into the tablet PC system. Such integrated peripherals include, for example, a wireless stethoscope and a wireless scanner such as a barcode scanner. Integration refers to the physical association of the peripheral with the tablet PC for mechanical retention and charging, as well as firmware and software that supports the use of the peripheral by the tablet PC. The present invention contemplates using a mobile computing device such as a tablet PC to charge rechargeable battery-powered integrated peripherals, making it unnecessary to provide separate power supplies for the peripherals. Charging contacts can be provided in a docking area for the peripheral, and the peripheral docking are can be located in the chassis of the mobile computing device. Using the tablet PC to charge the peripherals when they are replaced in their docking area ensures that the peripherals are ready for use as long as they are properly docked when not being used.

Referring to an embodiment of the invention illustrated in FIG. 1, a tablet PC includes a thin and light design targeted to the healthcare vertical market segment and tailored for use by healthcare professionals such as nurses and doctors. Key system design features might include a rugged, rounded, professional appearance and a sealed chassis resistant to bio-fluids and germ growth. The chassis should be constructed in a manner permitting it to withstand cleaning using anti-bacterial reagents. It is also desirable to provide an ergonomic layout with carry handle and peripheral positioning. Tablet PCs designed for different market segments may have additional or alternative design features.

When used to provide a tablet PC for hospitals or a clinical environment, the chassis may be designed to provide for the integration of peripherals such as a stethoscope, vital signs monitoring equiment (temperature, blood pressure, etc.), or other peripherals desired for medical professionals. In one embodiment, these devices communicate wirelessly with the tablet PC via Bluetooth (802.11) or another wireless data transmission protocol. An embodiment of the device utilizing the Bluetooth protocol may include a Bluetooth controller such as the Taiyo Yuden EYSFCCSXX module, to provide Bluetooth capability for the system. The Bluetooth controller may incorporate a CSR (Cambridge Silicon Radio) "Bluecore 4" radio chip, operating in the 2.4 GHz band. The chip implements Bluetooth 2.0 specifications, and includes AFH (advanced frequency hopping) and EDR (enhanced data rate) functions. The chip can interface to the tablet PC system using one of the USB ports available via the tablet PC's I/O controller hub, described below.

An embodiment of the chassis, as illustrated in FIG. 1, comprises a front acrylic protective plate with an LCD or other display screen. The chassis may also comprise a back plate comprised of a metal that dissipates heat quickly, such as magnesium, titanium, aluminum, copper, etc. The construction materials, of course, are merely presented for purposes of illustration. Those skilled in the art will recognize that a wide variety of metals and plastics may be used for any of the chassis components, provided that issues with magnetic and electrical shielding for the components and various antennae are accounted for.

According to an embodiment of the invention, the display screen may include an LCD, TFT, or other light-weight, portable display. An exemplary embodiment includes an AND Displays 10.4 inch color TFT/LCD Module, model ANDpSi104EA5S-HB. This display supports XGA (1024 (H)×768(V)) screen resolution and 262K (RGB 6-bits data driver) or 16.7M (RGB 8-bits data driver) color depths. The input signals are LVDS interface compatible and it uses a single side-firing CCFL backlight.

The chassis of the tablet PC is preferably fluid-resistant. To provide a chassis that is fluid resistant and resistant to cleaning with industrial chemical solvents, or other materials, the chassis components such as the front plate and the back plate may be assembled with interposing gaskets, such as for example rubber o-ring gaskets, which are able to provide fluid resistance for each of the seams where chassis components meet.

A stethoscope, or other peripheral, may be formed to insert into a retention mechanism such as a recessed caddy in the chassis front plate and rest in the caddy. The recessed caddy is preferably integrally molded into the front plate to maintain fluid resistance, but may alternatively comprise a separate, sealed part.

In an embodiment of the invention, there are at least two charging contacts between the peripheral and tablet PC: power and ground. The programmable voltage regulator supplies power to the battery charger on the peripheral. The peripheral battery power rail supplies power to the peripheral's voltage regulator which then both charges the peripheral battery when needed and supplies the rest of the peripheral circuitry, including the peripheral microcontroller.

To charge the battery of the mobile computing device, a "dock" (not shown) may be provided. A mobile computing device such s a tablet PC may be inserted into the dock in a known manner to recharge its batteries. In a preferred embodiment, the display screen remains viewable while the tablet PC is docked. LED indicators can be provided to communicate charging status.

In the illustrated embodiment of FIG. 1, the tablet PC includes a peripheral data-acquisition device for use by healthcare professionals. In the illustrated exemplary embodiment of the invention, the acquisition device is a wireless stethoscope, as shown in its docked position, for use by a clinician to examine heart and lung sounds of patients. The stethoscope may include a rechargeable battery and be capable of transmitting audio-output directly to a headset worn by the user. Preferably, the headset and the stethoscope are wireless and are, for example, Bluetooth-enabled. Alternatively, the stethoscope may transmit to the tablet PC and the tablet PC may re-transmit the audio output to a headset worn by the user or play the sound via an internal audio system and speaker. The stethoscope transmits information to the tablet PC regarding its battery level and may also transmit other functions desired by the healthcare professional. Information regarding the battery level may be transmitted wirelessly or when the stethoscope is docked.

The computer hardware component of a tablet PC typically includes a motherboard with a CPU. The CPU can be, for example, a 478-ball Dothan ULV processor in a micro- FCBGA package and may run nominally at, for example, 1.2 GHz in high frequency mode and at 600 MHz in low frequency mode. The CPU may be socketed or soldered to the motherboard. The system memory can be determined based on the intended application of the tablet PC through the use of commercially-available memory modules, and may include a DRAM module of 1 GB size.

The tablet PC includes an input/output controller hub (ICH) that provides input/output capabilities with suitable known storage device interfaces. The ICH can also provide USB ports for the tablet PC, for non-wireless devices such as cameras, barcode readers, wireless communication controllers, docking connectors, etc. The ICH further provides a low pin count (LPC) bus that connects to a firmware hub within the tablet PC. The firmware hub is preferably a Flash EPROM storing BIOS code. Embedded controller refers generally to a programmable microcontroller and may be, for example, a Hitachi H-8 keyboard/system controller.

The present invention contemplates charging various integrated peripherals. In an embodiment of the invention, the peripherals exchange data wirelessly with the PC, such that contact between the peripheral and the PC is only required for retaining (e.g., docking) and recharging the peripherals.

According to an embodiment of the invention, a tablet PC includes a recessed caddy to retain a peripheral. The peripheral may be, for example, an integrated wireless stethoscope, a thermometer, a blood glucose monitor, a blood pressure monitor, or a pulse monitor. The recessed caddy preferably has a shape that compliments the peripheral it is designed to hold. The recessed caddy includes a charging mechanism, such as charging contacts or other electrical connections such as inductive charges of a docking connector. When the peripheral holder is a recessed caddy into which the peripheral is inserted, electrical connections or contacts for the peripherals are provided within the cavity. In a preferred embodiment of the invention, the recessed caddy is integrally molded or sealed to retain the water-tight integrity of the PC as required.

Figure 2:
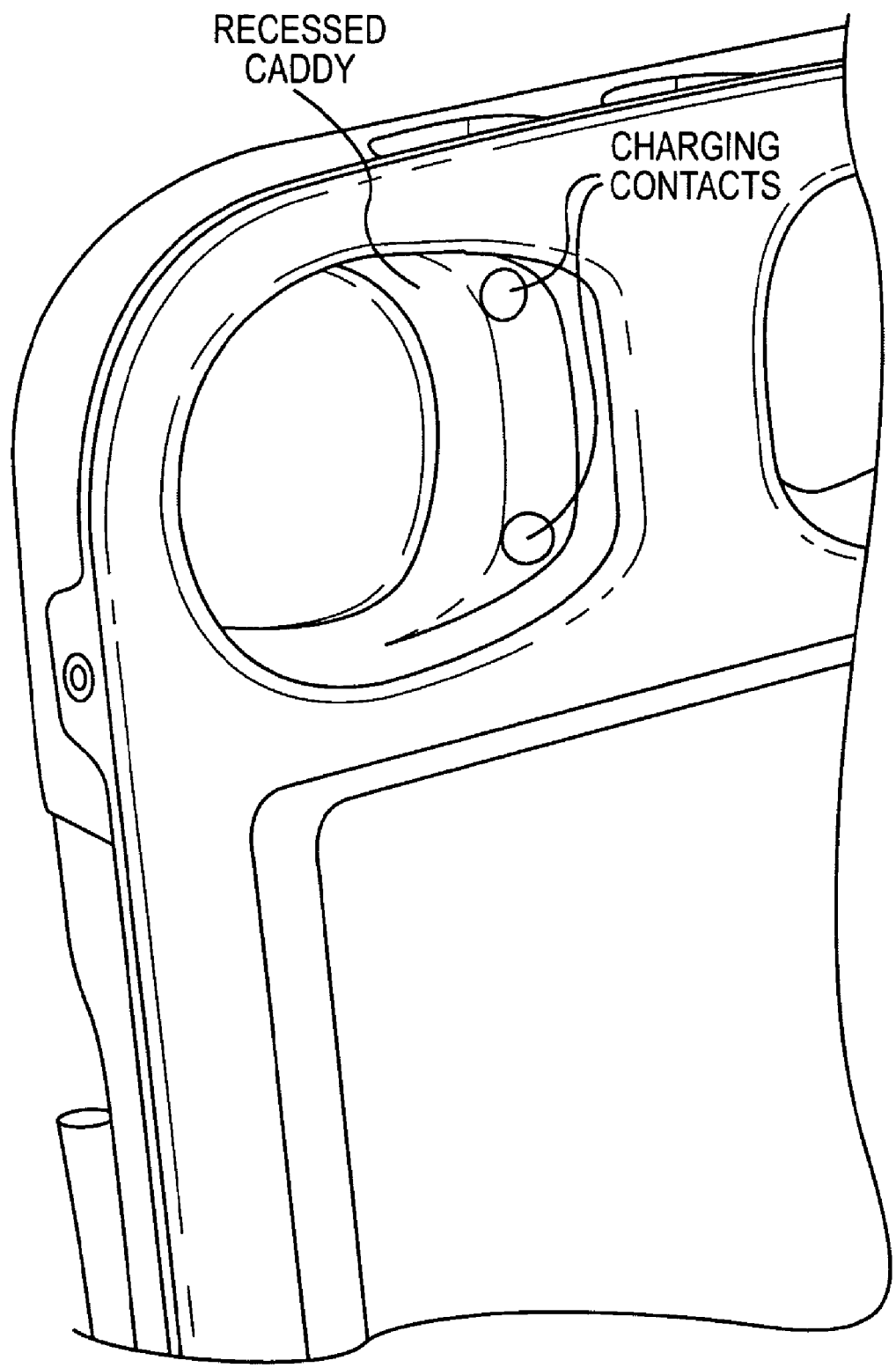
FIG. 2 is a perspective view of a tablet PC having a peripheral charger in accordance with the present invention, and a peripheral device inserted in the charger.

FIG. 2 illustrates an embodiment of a recessed caddy for retaining a peripheral such as a wireless stethoscope. In this embodiment, the recessed caddy extends into the chassis of the tablet PC from the front plate of the chassis. The present invention contemplates a variety of locations for the recessed caddy, such as extending into the chassis from its back plate. In the illustrated embodiment, the recessed caddy lies to the left of the tablet PC's carry handle, but may alternatively located on the right side of the carry handle. The present invention also contemplates multiple recessed caddies in the tablet PC, for example including one on the left side of the carry handle and one on the right side of the carry handle. The PC may include more than two recessed caddies, as needed, to accommodate various integrated peripherals. Although the embodiment of the recessed caddy illustrated in FIG. 2 is integrally molded into the tablet PC chassis, the present invention includes other suitable embodiment for the recessed cavity, preferably that are resistant to penetration by fluids.

As shown in the embodiment of FIG. 2, the recessed caddy retains a peripheral and also provides two charging contacts for electrically connecting the peripheral to the PC. The electrical connection of the peripheral to the PC can serve two purposes. The first is deliver power, and the second is to exchange information about the desired voltage level and current limit for power delivery. Alternatively, information can be exchanged wirelessly. In a preferred embodiment, the charging mechanism provides a power level that is based on the peripheral's power requirement.

As illustrated in FIG. 2, the charging contacts may be substantially flush with the surface of the recessed caddy, and preferably retain the fluid resistancy of the chassis.

Figure 3:
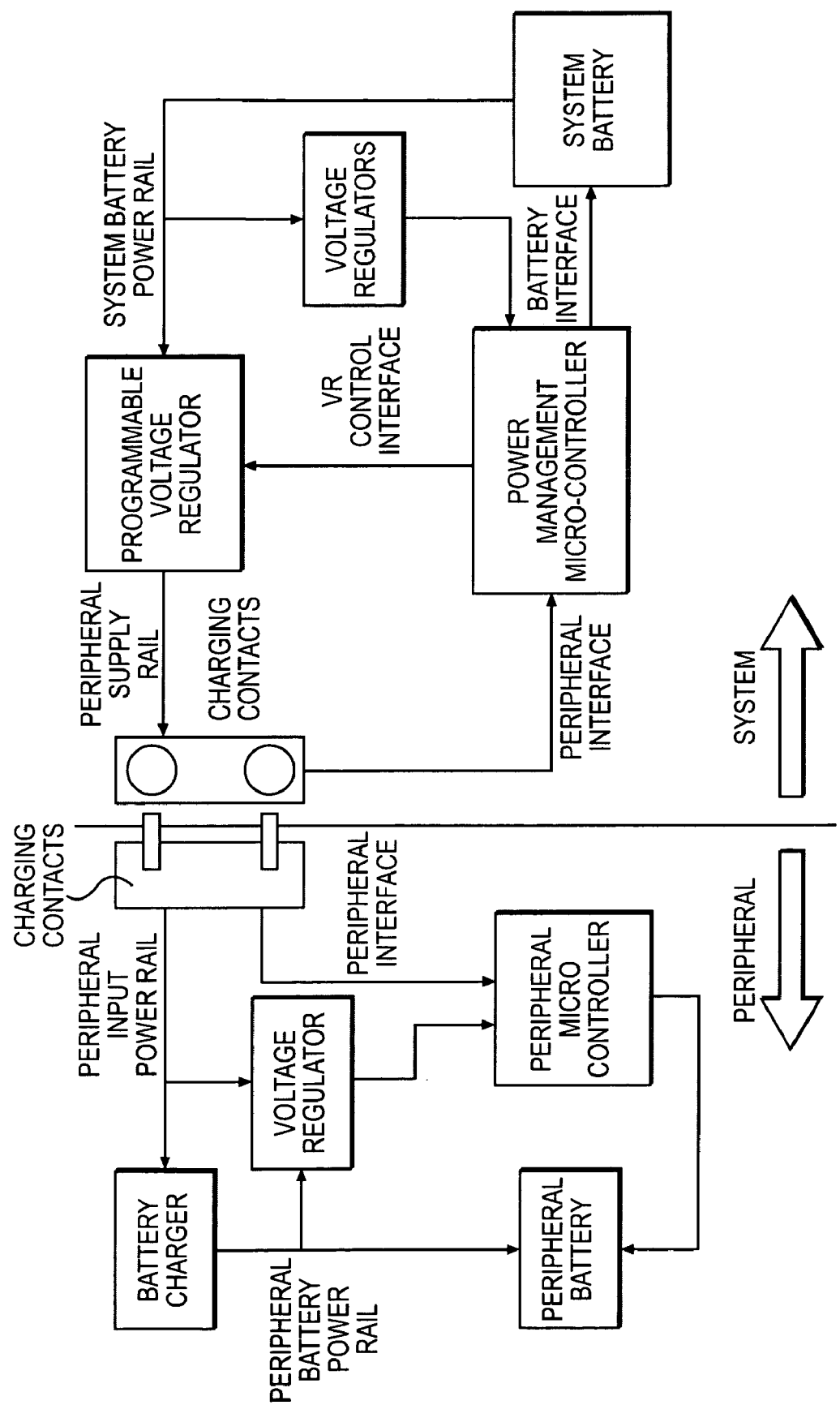
FIG. 3 is a block diagram of a peripheral charger's subsystem.

FIG. 3 illustrates a block diagram of a PC's peripheral charger subsystem and a charging system for a peripheral device. As shown, power management microcontroller controls the peripheral charging functionality. In a preferred embodiment of the invention, the power management microcontroller is the system microcontroller; however, separate microcontrollers may be provided. In operation, according to an embodiment of the invention, the power management microcontroller may query the peripheral for information such as whether its battery is rechargeable and functioning properly, how much charge the peripheral requires in voltage and current, and the peripheral's priority rating. A peripheral interface of the peripheral charger subsystem can be used by the power management microcontroller to query and receive information from the peripheral.

When the peripheral is docket or seated in the caddy, the power management microcontroller commands the programmable voltage regulator, via the voltage regulator (VR) control interface, to provide power to the peripheral. In a preferred embodiment of the invention, power is provided at a default voltage and current limit. The default voltage and current limit value can be independently specified for each peripheral or type of peripheral, to ensure that the peripheral can be charged even when they are unable to communicate their charge needs to the power management microcontroller. In a case where the peripheral is unable to communicate its charge needs because its battery is dead, an initial charge from the system upon being docked will enable the peripheral to communicate information such as its charge level, preferred voltage input and current limit levels, device type, system status, etc., to the power management microcontroller. Receiving information from the peripheral such as its remaining battery capacity and device type/priority, allows the power management microcontroller to determine whether it should provide/continue to provide power to the peripheral from the system battery.

As used herein, system battery refers generally to a power supply for a mobile computing device, and may be rechargeable. Battery interface refers generally to a communication boundary between the battery and one or more other entities, such as software or hardware. In an embodiment of the invention, the battery interface includes a two-wire serial interface such as a system management bus (SMB) or an Inter IC bus (I2C). The power management microcontroller is generally a type of microprocessor used to control or manage the mobile computing devices power sequence. In an embodiment of the invention, it may include a scan matrix keyboard controller or a typical laptop computer microcontroller. The programmable voltage regulator converts electrical power from one voltage to another and/or maintains a contant voltage. It can be programmed to drive output power at different voltage levels and current limits. Voltage regulator control interface, as used herein, refers generally to a communication boundary between the voltage regulator and one or more other entities, such as software or hardware (e.g., the power management microcontroller). In an embodiment of the invention, it includes a digital interface, such as an I2C bus.

In an embodiment of the invention, the power management microcontroller assures an appropriate voltage and current by controlling a voltage regulator. The voltage regulator provides a voltage and current based on information provided to the power management microcontroller by the peripheral. This information may include the voltage and current charge requirements of the peripheral. The power management microcontroller also monitors the capacity of the system battery to decide whether the system battery can and should provide power to the peripheral. The power management microcontroller first determines, for example, whether the peripheral battery is re-chargeable and is capable of accepting a charge. If the peripheral battery is not rechargeable or is, for example, incapable of accepting a charge from the system battery, the power management microcontroller will not initiate charging. In addition, if the peripheral battery's voltage and/or current requirements are too high for the system battery, the power management microcontroller will not initiate charging. Further, the power management microcontroller will not charge the peripheral battery if the PC's battery does not have a predetermine amount of charge remaining. For example, the power management microcontroller may be programmed to charge peripherals only if there is at least one hour of battery life left in the PC's battery (for the PC to power itself). The power management microcontroller's decision to charge the peripheral battery may additionally be based on how important the peripheral is. The power management policy of the microcontroller can be incorporated as part of the firmware image that is executed by the microcontroller. Priority rating can be read from the peripheral or otherwise determined by the microcontroller. The priority rating can be used to prioritize charging when one or more peripherals are docked and require charging. Priority rating can also be used to determine whether to charge a given peripheral if the system battery is below a predetermined level of charge.

An embodiment of the system of the present invention employs a smart battery system, which is a specification for determining accurate battery readings, allowing operating systems to perform power management operations based on remaining estimated run times. Through this communication, the system controls the amount of system battery charge. This is typically accomplished by a special integrated circuit in the battery pack that monitors the battery and reports information to the system management bus. Reported information might include: battery type, model number, manufacturer, characteristics, discharge rate, predicted remaining capacity, almost-discharged alarm so that the PC can shut down gracefully; temperature and voltage to provide safe charging.

The battery interface, as illustrated in FIG. 3, may be a smart battery interface when the PC utilizes a smart battery system as describe above. Another system interface, a voltage regulator control interface, allows the power management microcontroller to control a voltage regulator. The voltage regulator is an electrical regulator designed to automatically maintain a constant voltage level from the system battery to the peripheral charging contact(s). The voltage regulator is preferably programmable. The voltage regulator control interface allows the power management microcontroller to set the level of voltage and current supplied by the voltage regulator to the peripheral charging contact(s). For example, the power management microcontroller may use the voltage regulator control interface to tell the voltage regulator to provide a predetermined voltage to the peripheral battery (via the charging contacts) and limit the current to a given number of amps. This way, the voltage regulator is programmed by the power management microcontroller each time a peripheral is docked.

The battery voltage rail illustrated in FIG. 3 is a connection between the positive (+) side of the system battery, and the voltage regulator. Generally, 8-12 volts are supplied by the battery to the voltage regulator. The voltage regulator can then lower this voltage accordingly given the needs of the peripheral battery being charged. The peripheral supply rail is a connection between the voltage regaultor and the peripheral charging contact(s). In accordance with a more simple embodiment of the invention that is not illustrated, the charging circuitry can be as simple as two contacts with a current limiter that is powered by the system battery.

The disclosed invention has numerous, practical embodiments. The various embodiments are to inventions useful for those requiring a portable computing platform that is durable and resistant to penetration by liquids and moisture. The device is also resistant to chemical and other cleaning solvents used to minimize the spread of germs and bacterial through contact with portable objects in a hospital, clinical, and/or other environments. While the disclosed embodiments relate generally to a portable computing platform for medical professionals, those skilled in the art will readily recognize the need for a computing platform in accordance with the present invention in a wide variety of fields.

The invention claimed is:

1. A system comprising:
 a peripheral charging module arranged within a mobile computing device and configured to charge a first battery of a peripheral device through an electrical connection with a second battery of the mobile computing device; and
 a controller configured to manage power consumption of the second battery and determine if the second battery is capable of providing power to the first battery,
 wherein the mobile computing device contains firmware and software that supports wireless use of the peripheral device by the mobile computing device,
 wherein the mobile computing device is adapted to communicate wirelessly with the peripheral device and the peripheral device is adapted to communicate wirelessly with the mobile computing device, and
 wherein the peripheral device comprises a wireless medical device,
 wherein the controller is configured to determine if the second battery has a power capacity level above a predetermined charge threshold to charge the first battery, to determine an operating time remaining to the mobile computing device provided by the second battery and to determine the predetermined charge threshold is based on the determined operating time.

2. The system of claim 1, further comprising a programmable voltage regulator.

3. The system of claim 2, further comprising voltage control interface.

4. The system of claim 1, wherein the system is configured to provide power at a default voltage and current.

5. The system of claim 1, wherein the controller is configured to manage charging power.

6. The system of claim 5, wherein the controller is configured to prioritize charging of one or more peripheral devices.

7. A mobile computing device comprising:
 a peripheral device receiving member arranged within the mobile computing device and dimensioned such that a peripheral device is physically retained within the peripheral device receiving member;
 a peripheral charging module arranged within the mobile computing device and electrically connected to the peripheral device receiving member and configured to charge a first battery of the peripheral device through an electrical connection with a second battery of the mobile computing device;
 a controller configured to manage power consumption of the second battery and determine if the second battery is capable of providing power to the first battery; and firmware and software that supports wireless use of the peripheral device by the mobile computing device and wherein the mobile computing device is adapted to communicate wirelessly with the peripheral device and the peripheral device is adapted to communicate wirelessly with the mobile computing device, wherein the peripheral device comprises a wireless medical device, wherein the controller is configured to determine if the second battery has a power capacity level above a predetermined charge threshold to charge the first battery, to determine an operating time remaining to the mobile computing device provided by the second battery and to determine the predetermined charge threshold is based on the determined operating time.

8. The mobile computing device of claim 7, further comprising a charging status indicator.

9. The mobile computing device of claim 8, wherein the charging status indicator comprises LEDs.

10. The mobile computing device of claim 7, further comprising an electrical connection between the peripheral device and the mobile computing device.

11. The mobile computing device of claim 10, wherein the electrical connection is configured to deliver power and to exchange information between the peripheral device and the mobile computing device.

12. The mobile computing device of claim 7, wherein the controller is configured to determine if the battery of the peripheral device is rechargable and/or functioning properly.

13. The mobile computing device of claim 7, wherein the peripheral device comprises an integrated circuit configured to report information to the mobile computing device.

14. The mobile computing device of claim 13, wherein the information includes one or more of battery type, model number, manufacturer, characteristics, discharge rate, predicted remaining capacity, almost-discharged alarm, temperature or voltage.

15. A method comprising:
electrically connecting a peripheral device to a mobile computing device;
determining if a first battery of the mobile computing device can provide power to a second battery of the peripheral device;
charging, based on the determining, the second battery of the peripheral device with the first battery through a peripheral charging system in the mobile computing device;
determining if the first battery has a power capacity level above a predetermined charge threshold to charge the second battery;
determining an operating time remaining to the mobile computing device provided by the first battery; and
determining the predetermined charge threshold based on the determined operating time, wherein the peripheral charging system is built into the mobile computing system, wherein the mobile computing device contains firmware and software that supports wireless use of the peripheral device by the mobile computing device, wherein the mobile computing device is adapted to communicate wirelessly with the peripheral device and the peripheral device is adapted to communicate wirelessly with the mobile computing device, wherein the peripheral device comprises a wireless medical device.

16. The method of claim 15, further comprising independently specifying a default voltage and current limit for each peripheral device or each type of peripheral device.

17. The method of claim 15, further comprising providing an initial charge to the peripheral device from the mobile computing device if the peripheral device is unable to communicate.

18. The method of claim 15, further comprising receiving information from the peripheral device.

19. The method of claim 18, wherein the information comprises one or more of charge level, remaining battery capacity, device type, device priority, preferred voltage input limit level, preferred current limit level, or system status.

20. The system of claim 1, wherein the controller is configured to determine one or more characteristics of the first battery, wherein the one or more characteristics are selected from the group consisting of: type of battery, operating voltage or voltage range, operating current or current range, and combinations thereof.

21. The system of claim 20, wherein the type of battery includes rechargeable and non-rechargeable batteries.

22. The mobile computing device of claim 7, wherein the controller is configured to determine one or more characteristics of the first battery, wherein the one or more characteristics are selected from the group consisting of: type of battery, operating voltage or voltage range, operating current or current range, and combinations thereof.

23. The mobile computing device of claim 22, wherein the type of battery includes rechargeable and non-rechargeable batteries.

* * * * *